United States Patent
Allen

(10) Patent No.: US 8,469,399 B2
(45) Date of Patent: Jun. 25, 2013

(54) INTERLOCKING SEAL

(75) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 123 days.

(21) Appl. No.: 13/223,367

(22) Filed: Sep. 1, 2011

(65) Prior Publication Data

US 2013/0057015 A1 Mar. 7, 2013

(51) Int. Cl.
 *B62D 1/16* (2006.01)
 *F16J 15/50* (2006.01)

(52) U.S. Cl.
 USPC .............................. 280/779; 277/630; 277/637

(58) Field of Classification Search
 USPC ......... 280/779; 74/492; 403/50, 51; 277/630, 277/634, 635, 636, 637, 638, 640, 641, 644, 277/654; 464/173
 See application file for complete search history.

(56) References Cited

U.S. PATENT DOCUMENTS

| | | | |
|---|---|---|---|
| 1,885,121 A * | 11/1932 | Loweke | 137/493.2 |
| 4,826,466 A * | 5/1989 | Triquet | 464/173 |
| 4,840,386 A | 6/1989 | Peitsmeier et al. | |
| 5,941,123 A * | 8/1999 | Numakami | 74/18.1 |
| 6,056,297 A | 5/2000 | Harkrader et al. | |
| 6,328,315 B1 * | 12/2001 | Hebenstreit | 277/634 |
| 7,272,989 B2 * | 9/2007 | Schuh | 74/492 |
| 7,407,442 B2 * | 8/2008 | Terashima | 464/173 |
| 7,641,561 B2 * | 1/2010 | Moriyama et al. | 464/173 |
| 2006/0108782 A1 * | 5/2006 | Kanazawa et al. | 280/779 |
| 2006/0199653 A1 * | 9/2006 | Terashima | 464/173 |
| 2008/0231003 A1 * | 9/2008 | Moriyama et al. | 277/636 |
| 2012/0023721 A1 * | 2/2012 | Glachet | 29/281.5 |

* cited by examiner

*Primary Examiner* — Joseph Rocca
*Assistant Examiner* — Barry Gooden, Jr.
(74) *Attorney, Agent, or Firm* — Quinn Law Group, PLLC

(57) ABSTRACT

An interlocking seal assembly includes a panel having a first side and a second side and defining a hole. The seal assembly also includes an outer seal and an inner seal. A shaft extends through the outer seal, the inner seal, and the hole. The outer seal is mounted with respect to the panel such that the outer seal contacts the first side of the panel and thereby forms a first face seal around the hole. The inner seal is mounted with respect to the panel such that the inner seal contacts the outer seal and thereby forms a second face seal around the hole. The inner seal contacts the second side of the panel and thereby forms a third face seal around the hole.

11 Claims, 4 Drawing Sheets

INTERLOCKING SEAL

TECHNICAL FIELD

This invention relates to seals that seal holes in panels having shafts extending therethrough.

BACKGROUND

A motor vehicle typically includes a dash panel, or bulkhead, that separates the passenger compartment from an engine compartment. A steering shaft passes through a hole in the dash panel to connect the steering wheel, which is in the passenger compartment, to the steering gear, which is in the engine compartment. A seal is typically employed between the dash panel and the shaft to prevent noise, gases, water, and debris from entering the passenger compartment from the engine compartment via the hole in the dash panel.

SUMMARY

An interlocking seal assembly includes a panel having a first side and a second side and defining a hole. The seal assembly also includes an outer seal and an inner seal. A shaft extends through the outer seal, the inner seal, and the hole. The outer seal is mounted with respect to the panel such that the outer seal contacts the first side of the panel and thereby forms a first face seal around the hole. The inner seal is mounted with respect to the panel such that the inner seal contacts the outer seal and thereby forms a second face seal around the hole. The inner seal contacts the second side of the panel and thereby forms a third face seal around the hole.

The above features and advantages and other features and advantages of the present invention are readily apparent from the following detailed description of the best modes for carrying out the invention when taken in connection with the accompanying drawings.

DETAILED DESCRIPTION

Figure 1:
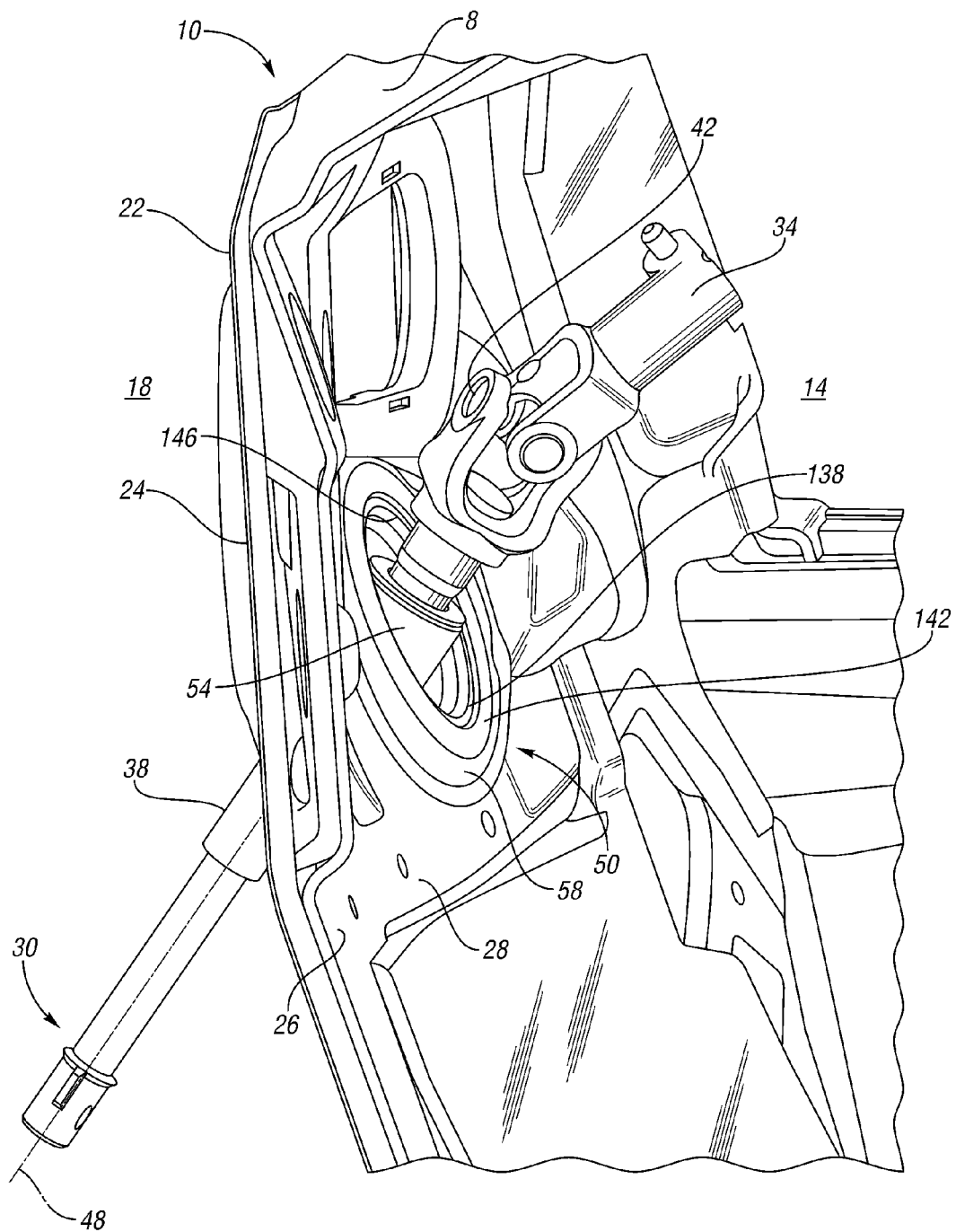
FIG. 1 is a schematic, perspective view of a seal assembly that seals a hole in a panel assembly with a steering shaft extending therethrough.

Referring to FIG. 1, a vehicle 8 includes a panel assembly 10 that at least partially defines, and separates, a vehicle passenger compartment 14 and a vehicle engine compartment 18. The panel assembly 10 functions as a vehicle bulkhead. The panel assembly 10 include a laminated dash panel 22 and an acoustic mat 26 mounted to the dash panel 22. The acoustic mat 26 provides sound insulation to reduce the transmission of noise from the engine (not shown) in the engine compartment 18 to the passenger compartment 14.

The dash panel 22 defines a first surface 24 of the panel assembly 10, which defines the rear wall of the engine compartment 18. The acoustic mat 26 defines a second surface 28 of the panel assembly 10, which at least partially defines the passenger compartment 14. The vehicle 8 also includes a steering shaft assembly 30 that is configured to transmit torque from the steering wheel (not shown) in the passenger compartment 14 to a steering gear (not shown) in the engine compartment 18. The steering shaft assembly 30 includes a first shaft 34 and a second shaft 38. The first shaft 34 is operatively connected to the steering wheel for rotation therewith in the passenger compartment 14. The first shaft 34 is operatively connected to the second shaft 38 via a universal joint 42 to impart rotational movement thereto. The second shaft 38 extends from the passenger compartment 14 into the engine compartment 18 through a hole (shown at 46 in FIGS. 2-4) in the dash panel 22. The second shaft 38 is selectively rotatable about axis 48. The second shaft 38 is partially coextensive with the axis 48.

Figure 2:
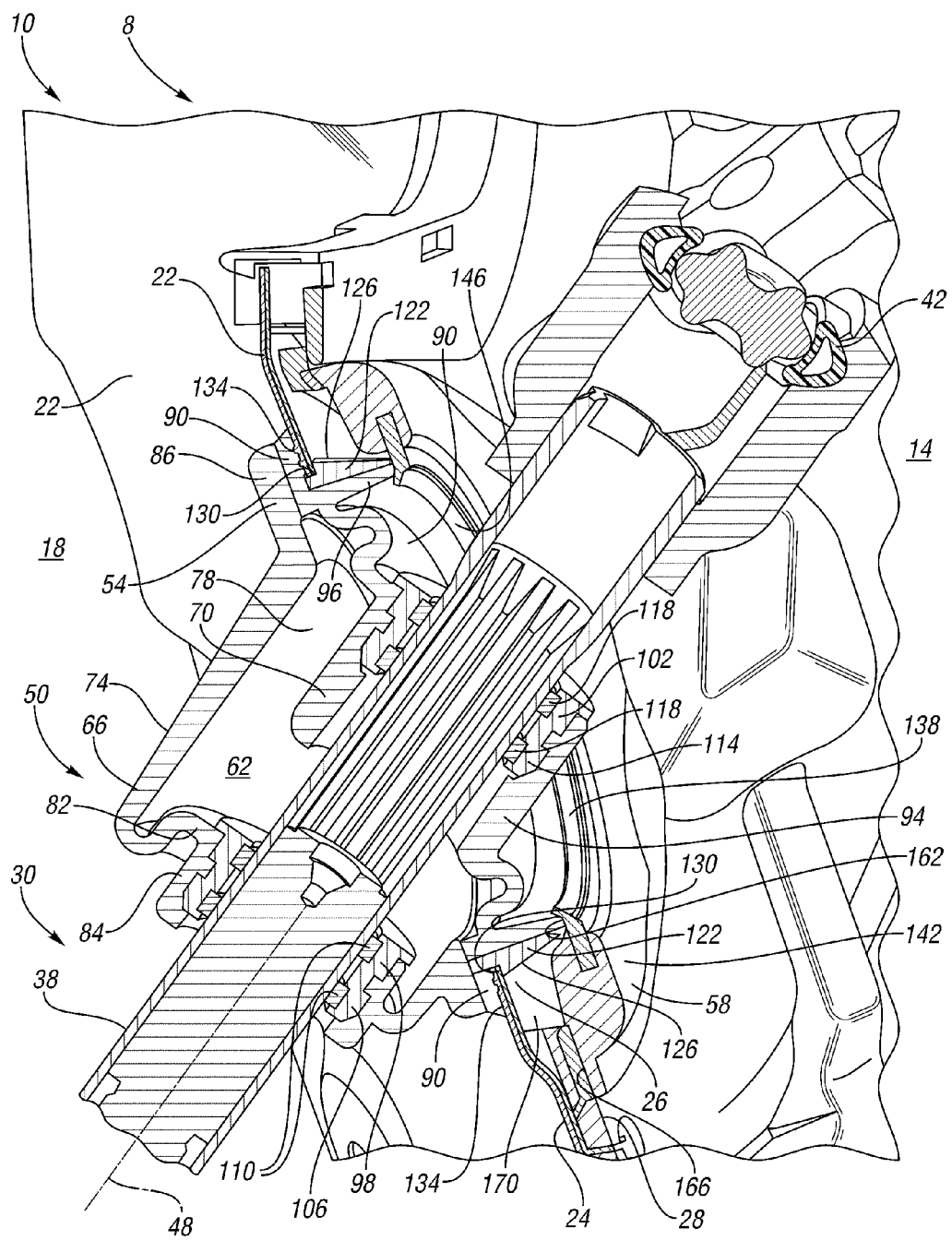
FIG. 2 is a schematic, cross-sectional, side view of the seal assembly of FIG. 1.
Figure 3:
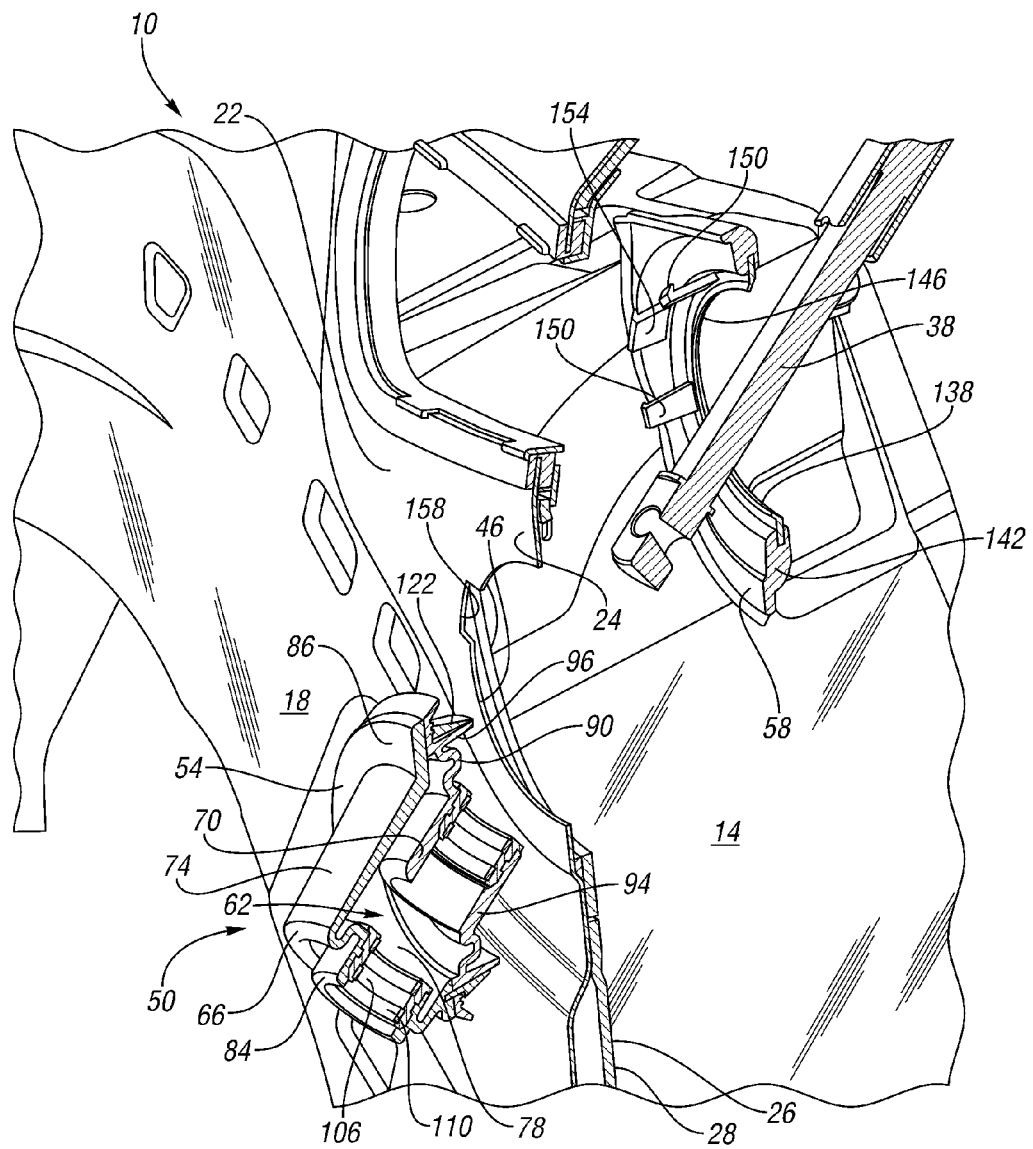
FIG. 3 is a schematic, partially exploded, perspective view of the seal assembly of FIGS. 1 and 2.
Figure 4:
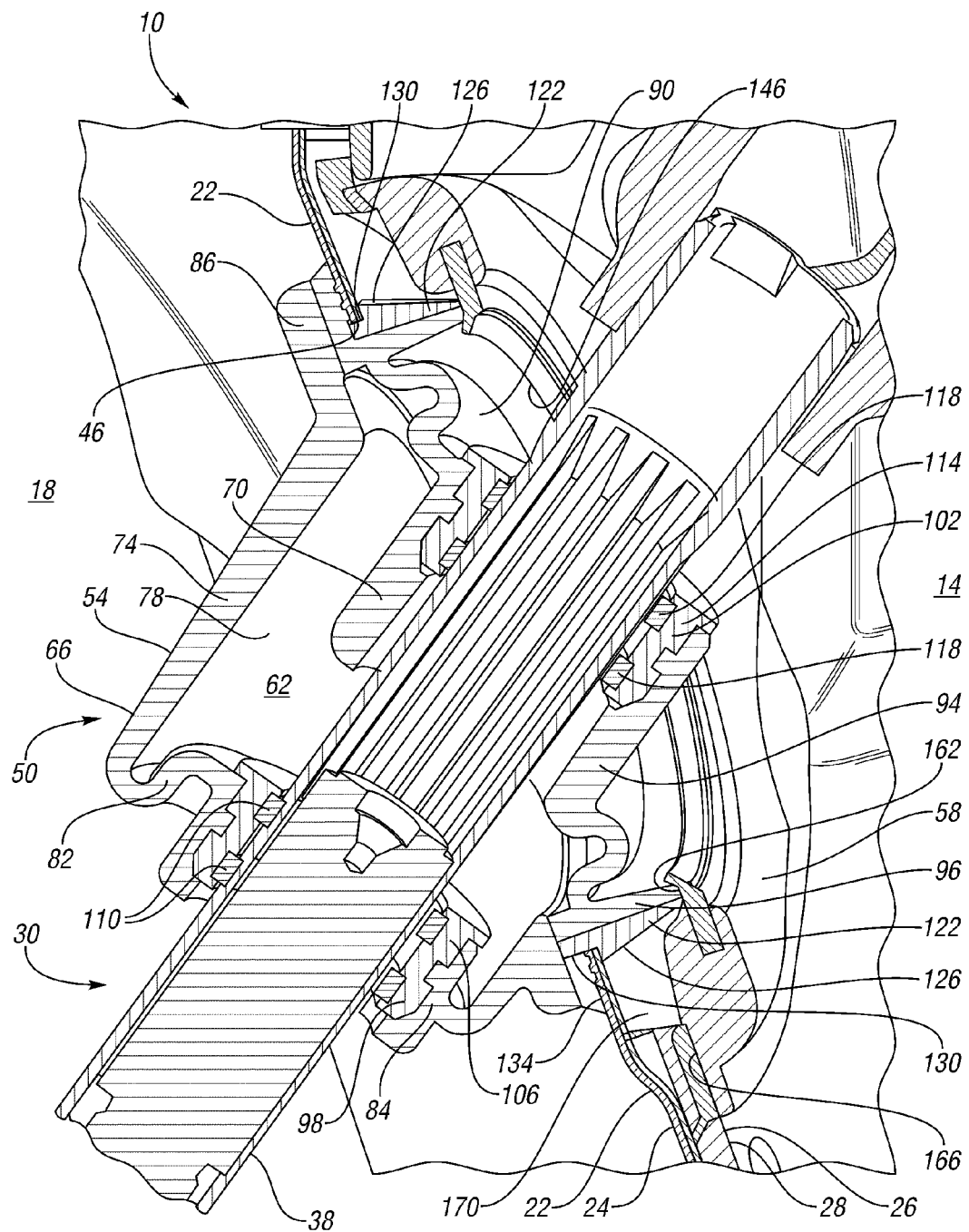
FIG. 4 is a schematic, cross-sectional, side view of the seal assembly of FIGS. 1-3.

The vehicle 8 further includes a seal assembly 50 that is configured to prevent noise, gases, water, and debris from entering the passenger compartment 14 through the hole 46 in the dash panel 22. Referring to FIGS. 2-4, the seal assembly 50 includes an outer seal 54 and an inner seal 58. The outer seal 54 defines a first dead air cavity 62. More specifically, the outer seal 54 includes a first member 66 and a second member 70. In the embodiment depicted, the first member 66 includes a generally cylindrical portion 74 that extends primarily in the axial direction, i.e., parallel to axis 48. The generally cylindrical portion 74 is characterized by a generally cylindrical inner surface 78 that partially defines the first dead air cavity 62. The first member 66 also includes a generally annular portion 82 that extends primarily radially inward from one end of the cylindrical portion 74. Another generally cylindrical portion 84 extends axially from the generally annular portion 82. The first member 66 further includes another generally annular portion 86 that extends radially outward from another end of the cylindrical portion 74.

The second member 70 includes yet another generally annular portion 90 that is mounted to, and contacts, the generally annular portion 86, and that extends radially inward from the generally annular portion 86. The second member 70 also includes a generally cylindrical portion 94 that extends axially from the inner edge of the generally annular portion 90. Another generally annular portion 96 extends axially from portion 90.

A first bushing assembly 98 is mounted to cylindrical portion 84, and a second bushing assembly 102 is mounted to cylindrical portion 94. Portions 74, 82, and 90 cooperate to at least partially define the first dead air cavity 62. The cavity 62 is characterized by only two openings, namely at the first and second bushing assemblies 98, 102. The second shaft 38 extends through the openings of the first bushing assembly 98 and the second bushing assembly 102, thereby sealing off the first dead air cavity 62. The first bushing assembly 98 includes a bushing tube 106 and two low-friction bushings 110 mounted to the tube 106. The bushings 110 sealingly contact the second shaft 38. Similarly, the second bushing assembly 102 includes a bushing tube 114 and two low-friction bushings 118 mounted to the tube 114. The bushings 118 sealingly contact the second shaft 38.

The outer seal 54 includes a plurality of fasteners to mount the outer seal to the dash panel 22. More specifically, in the embodiment depicted, the fasteners are clips 122 that extend from portion 90 of the second member 70. Each clip 122 is characterized by a respective angled surface 126 and a notch 130. The clips 122 are configured and arranged such that, as the clips 122 are inserted into the hole 46, the surfaces 126 contact the dash panel 22, thereby causing elastic deformation of the clips 122 in a radially inward direction until the dash panel 22 extends into the notches 130. Once the dash panel 22 enters the notches 130, the deformation of the clips 122 is at least partially reversed and the dash panel 22 remains in the notches 130 in the absence of a radially inward force on the clips 122. Thus, the clips 122 provide a snap-fit connection between the outer seal 54 and the dash panel 22. The clips 122 abut the generally annular portion 96, which also extends through the hole 46 and is at least partially inside the passenger compartment 14 when the outer seal 54 is attached to the dash panel 22.

The outer seal 54 is configured such that the annular portion 90 contacts the surface 24 of the dash panel 22 when the clips 122 are engaged with the dash panel 22. More specifically, the interaction between the annular portion 90 and the dash panel 22 around the hole 46 forms a first face seal 134 that entirely surrounds the hole 46 on one side of the dash panel 22.

The inner seal 58 includes a third member 138 and a fourth member 142. The third member 138 defines another hole or aperture 146. The fourth member 142 is mounted to the third member 138 such that the fourth member 142 surrounds the third member 138. The inner seal 58 also includes a plurality of fastening elements, namely clips 150, that are operative to selectively mount the inner seal 58 to the outer seal 54 and the dash panel 22. The inner seal 58 also includes a key 154 that corresponds to notch 158 to ensure proper alignment with the dash panel 22.

When the inner seal 58 is mounted to the outer seal 54, as shown in FIGS. 1, 2, and 4, the third member 138 contacts the generally annular portion 96, thereby forming a second face seal 162 that surrounds the hole 46. Furthermore, the fourth member 142 also contacts the surface 28 of the acoustic mat 26, thereby forming a third face seal 166 that surrounds the hole 46. A second dead air cavity 170 is formed in the space between the fourth member 142, the mat 26, and portion 96. The second dead air cavity 170 is sealed by face seals 162 and 166.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a panel having a first side and a second side and defining a hole;
a seal assembly having an outer seal and an inner seal;
a shaft extending through the outer seal, the inner seal, and the hole;
wherein the outer seal is mounted with respect to the panel such that the outer seal contacts the first side of the panel and thereby forms a first face seal around the hole;
wherein the inner seal is mounted with respect to the panel such that the inner seal contacts the outer seal and thereby forms a second face seal around the hole; and
wherein the inner seal contacts the second side of the panel and thereby forms a third face seal around the hole.

2. The apparatus of claim 1, wherein the shaft is selectively rotatable about an axis;
wherein the outer seal includes a first annular portion that contacts the first side of the panel to form the first face seal;
wherein the outer seal includes a second annular portion that extends through the hole; and
wherein the inner seal contacts the second annular portion to form the second face seal.

3. The apparatus of claim 2, wherein the outer seal includes a plurality of clips that extend through the hole and engage the panel to retain the outer seal to the panel; and
wherein the clips abut the second annular portion.

4. The apparatus of claim 2, wherein the outer seal defines a dead air cavity; and
wherein the shaft extends through the dead air cavity.

5. The apparatus of claim 4, wherein the outer seal includes a first bushing and a second bushing axially spaced apart from the first bushing; and
wherein the shaft extends through the first and second bushings.

6. A vehicle comprising:
a dash panel assembly having a dash panel, an acoustic mat, and defining a hole;
wherein the dash panel defines a first surface of the dash panel assembly;
wherein the acoustic mat defines a second surface of the dash panel assembly;
a seal assembly having an outer seal and an inner seal;
a steering shaft extending through the outer seal, the inner seal, and the hole;
wherein the outer seal is mounted with respect to the dash panel such that the outer seal contacts the first surface and thereby forms a first face seal around the hole;
wherein the inner seal is mounted with respect to the dash panel such that the inner seal contacts the outer seal and thereby forms a second face seal around the hole; and
wherein the inner seal contacts the second surface and thereby forms a third face seal around the hole.

7. The vehicle of claim 6, wherein the dash panel at least partially defines a vehicle engine compartment; and
wherein the acoustic mat at least partially defines a vehicle passenger compartment.

8. The vehicle of claim 6, wherein the steering shaft is selectively rotatable about an axis;
wherein the outer seal includes a first annular portion that contacts the first surface to form the first face seal;
wherein the outer seal includes a second annular portion that extends through the hole; and
wherein the inner seal contacts the second annular portion to form the second face seal.

9. The vehicle of claim 8, wherein the outer seal includes a plurality of clips that extend through the hole and engage the dash panel assembly to retain the outer seal to the panel; and
wherein the clips abut the second annular portion.

10. The vehicle of claim 8, wherein the outer seal defines a dead air cavity; and
wherein the shaft extends through the dead air cavity.

11. The vehicle of claim 10, wherein the outer seal includes a first bushing and a second bushing axially spaced apart from the first bushing; and
wherein the shaft extends through the first and second bushings.

* * * * *